United States Patent [19]

Umashankar

[11] Patent Number: 4,756,528

[45] Date of Patent: Jul. 12, 1988

[54] VIDEO SYSTEM FOR PASSENGER VEHICLES

[76] Inventor: Ramon Umashankar, 6201 N. Camino Esquina, Tucson, Ariz. 85718

[21] Appl. No.: 889,144

[22] Filed: Jul. 24, 1986

[51] Int. Cl.⁴ .............................................. A63F 9/00
[52] U.S. Cl. ........................... 273/1 E; 273/DIG. 28; 273/148 B; 297/163; 211/153; 108/28; 108/45
[58] Field of Search ................ 273/1 E, 148 B, 85 G, 273/DIG. 28; 340/712, 773; 312/313-316, 317 R, 317 A, 258; 108/6, 39, 28, 45; 297/163-166; 211/153; 358/254

[56] References Cited

U.S. PATENT DOCUMENTS

| | | | |
|---|---|---|---|
| 4,200,166 | 4/1980 | Hansen | 273/148 B |
| 4,390,873 | 6/1983 | Kirsch | 273/148 B |
| 4,476,463 | 10/1984 | Ng et al. | 340/712 |
| 4,521,021 | 6/1985 | Dixon . | |
| 4,584,603 | 4/1986 | Harrison | 273/148 B |
| 4,611,203 | 9/1986 | Criscimagna et al. | 340/773 |
| 4,630,821 | 12/1986 | Greenwald | 273/148 B |

FOREIGN PATENT DOCUMENTS 2120507 11/1983 United Kingdom ....... 273/DIG. 28

OTHER PUBLICATIONS

Washington Star, 11-79, p. 27.
Ahl, "Hig-Resolution and Color LCDs", Creative Computing, 2/85, vol. 11, #2, p. 114.

Primary Examiner—Maryann Lastova
Attorney, Agent, or Firm—Henderson & Sturm

[57] ABSTRACT

A video system incorporated into the back of a typical passenger seat, as on an airplane, bus, etc. The system includes a TV screen disposed normally in an upright position and recessed at least in part in the usual recess in a seat back. The arm rest of the seat next rearwardly carries various controls by means of which several modes of TV operation are available, along with the playing of music, commentaries and the like via cassettes in the arm rest, a master array of cassettes located centrally in the aircraft, disk drives, and improved power supply.

9 Claims, 1 Drawing Sheet

VIDEO SYSTEM FOR PASSENGER VEHICLES

BACKGROUND AND SUMMARY OF THE INVENTION

It is known in at least one instance to provide a seatback mounted TV in a passenger vehicle. See, for example, the U.S. Pat. No. 4,521,021 to Dixon. In that disclosure, the TV screen is normally covered by a form of tray table in stored position and is not available for viewing unless the tray is swung down to serving position. The top of the tray, which is the face facing the screen when the tray is closed, is compartmented for the purpose of containing a plurality of hand-held, battery-operated games. The patented system is deficient in many respects, including use of a cathode ray tube as a TV screen, whereas such tube has not yet been adapted to the space limitations imposed by the seat back environment. The patent does not address power requirements, the use of disk drives and the like. The cathode ray tube (CRT) cannot be physically accommodated in the passenger seat behind the tray because the seat cushion is four to five inches thick and a nine inch CRT is at least eight to ten inches deep.

According to the present invention, the foregoing disadvantages have been eliminated. The screen is always available for viewing; that is, it does not depend upon dropping a tray table to serving position. On the other hand, when the screen unit is hinged rearwardly and downwardly, its opposite face serves as a tray. The arm rest in the seat next to the rear of the seat having the screen is equipped with a plurality of controls for the screen. The screen may be either a liquid-crystal display or gas plasma type. Among the capabilities of the system are menu selection, use of a joy stick, a mouse, central power, disk drives and the like, all of which will become apparent as a preferred embodiment of the invention is disclosed in detail herein.

DETAILED DESCRIPTION OF A PREFERRED EMBODIMENT OF THE INVENTION

Figure 1:
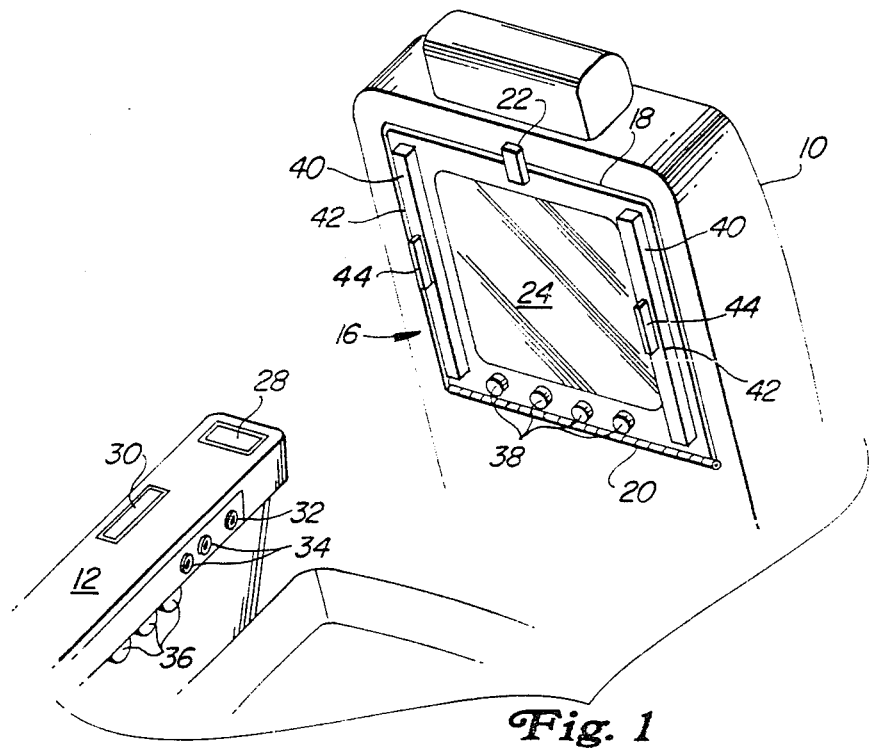
FIG. 1 is a perspective, with portions omitted, of an arrangement of two seats, one behind the other, and showing the screen mounted in the back of the forward seat and viewable by the occupant of the rearward seat.
Figure 2:
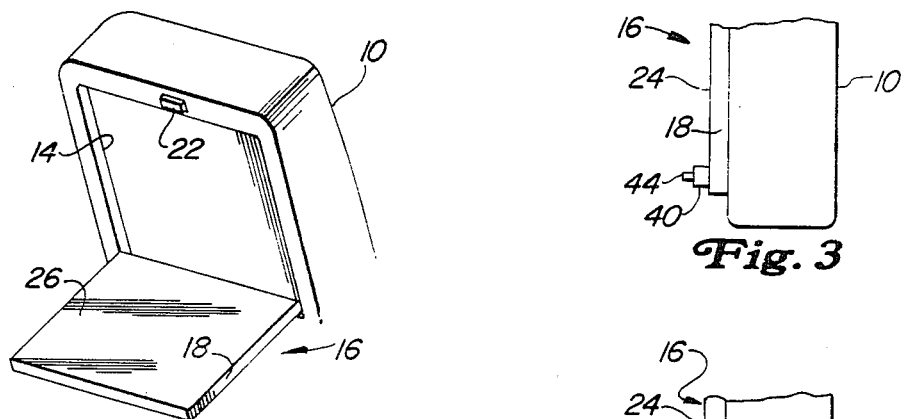
FIG. 2 is a similar view but showing the screen unit disposed s a tray in serving position.
Figure 3:
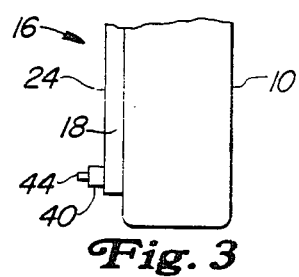
FIG. 3 is a fragmentary view illustrating one form of side shield in stored condition.

FIG. 1 shows a typical seat arrangement in which a first seat, having a seat back (10) is disposed immediately ahead of a second seat having an arm rest (12). As best seen in FIG. 2, the seat back is formed with a rectangular recess (14) which, in this case, is used to accommodate a video unit (16). In one form of the invention, the unit has a rectangular frame (18) contoured according to the seat back recess and hinged along its lower edge at (20) to the seat back. This provides for selective swinging of the unit between the viewing position of FIG. 1 to the tray position of FIG. 2. A latch (22) is provided for holding the unit in its FIG. 1 position. The frame carries and surrounds a TV screen (24) that employs either liquid-crystal display or gas plasma technology, as well as touch-screen capabilities. When the unit is in its FIG. 2 position, it provides a tray (26).

The arm rest is constructed so as to contain a typical ash tray (28) and may have a receptacle (30) for a conventional cassette. A control panel (32) is provided, preferably along the inner side of the arm rest and includes a headphone socket (32) a joy stick socket (34) and additional rotatable elements (36) for volume, tone, color, etc; although these and additional controls may be provided at the unit (16), as indicated at (38). Typical mechanical and electrical connections (not shown) may be effected among the unit and the control elements. In lieu of a cassette receptacle, the vehicle or aircraft may be provided with a central master cartridge player (not shown), suitably connected to the video system. Likewise, various forms of disk players and drives may be employed to enhance the performance and flexibility of the system.

Figure 4:
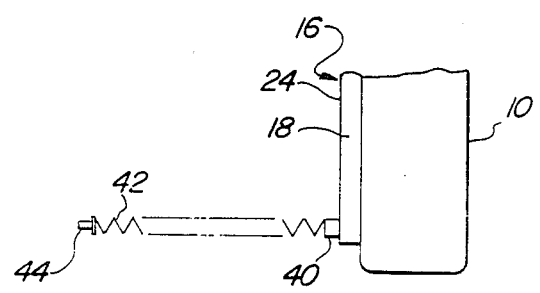
FIG. 4 is a like view but showing the shield extended.

Another feature of the invention is the provision of side shields that may be extended to shield the screen from neighboring passengers. These shields may take many forms. In those shown here by way of example only, the unit frame has a pair of vertically elongated receptacles (40) that open to the rear. Each of these contains a pleated or accordion-type shield (42) which, when extended (FIG. 4), projects rearwardly alongside the screen. Each shield has a handle (44) for convenience in pulling the shield out and pushing it back in. The material of which the shields are made may be of any known type having sufficient rigidity to maintain the extended position shown.

Among the features of the invention are constant availability of the screen for viewing, use of a mouse for cursor movement, touch screen for menu selection and joy stick for games, the connectability to compact disk drives or other storage media drives, which may be located in the arm rest or centrally in the vehicle, aircraft, etc., and the use of liquid-crystal display or gas plasma technologies in the screen so as to easily fit the screen into the limited space available in the typical seat back as well as to accommodate the menu, etc. features.

Features other than those specifically pointed out will readily occur to those versed in the art, as will many modifications in the preferred embodiment disclosed, all without departing from the spirit and scope of the invention.

I claim:

1. A video system for use in a passenger vehicle having an array of seats including a first seat having a recessed back and a second seat directly behind the first seat, said system comprising a video screen dimensioned to be receivable in the recessed back, hinge means on a horizontal axis mounting the screen at its bottom to the recessed back for selective positioning in an upright mode received in the recess and facing rearwardly to be viewed by a passenger in the second seat and in a horizontal mode serving as a table for the second seat passenger.

2. The video system of claim 1, further including an upright partition recessed into the first seat back in a stored position and movable rearwardly and along one side of the screen to serve as a side shield for the screen.

3. The video system of claim 1, further including a joy stick receptacle for use in the playing of games on the screen.

4. The video system of claim 1, in which the screen is of the liquid-crystal display type.

5. The video system of claim 1, in which the screen is of the gas plasma type.

6. The video system of claim 1, in which the screen has touch screen capabilities.

7. The video system of claim 1, having a mouse for cursor movement, touch screen capabilities for menu selection, and joy stick capabilities for games.

8. The video system of claim 1, including storage media drives.

9. The video system of claim 1, including a power supply for the system.

* * * * *